Figure 1:
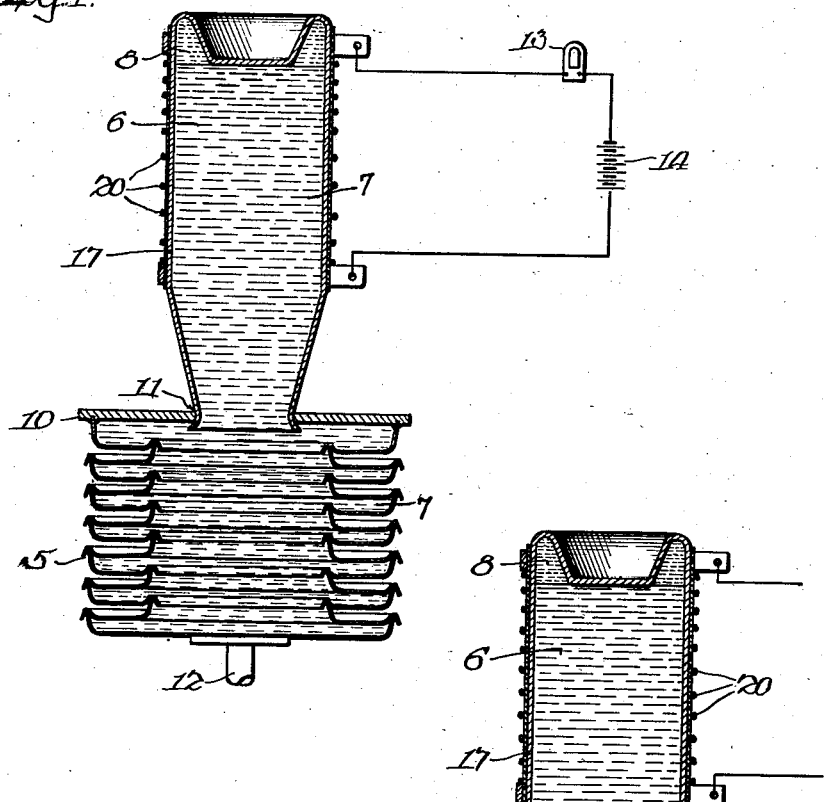

Dec. 5, 1933.                J. S. BAKER                1,938,167
                              HEAT MOTOR
                          Filed Aug. 12, 1929

Inventor.
John S. Baker.

Patented Dec. 5, 1933

1,938,167

UNITED STATES PATENT OFFICE 1,938,167

HEAT MOTOR

John S. Baker, Chicago, Ill., assignor to Cook Electric Company, Chicago, Ill., a corporation of Illinois Application August 12, 1929. Serial No. 385,110

2 Claims. (Cl. 60—25)

My invention relates to heat motors and thermally-controlled vapor motors, and more particularly, to a vapor motor adapted to be influenced by a volatile fluid or like means.

It has heretofore been proposed to provide in a heat motor a fluid pressure container for a volatile fluid and a heating element in heat interchanging relation therewith, the latter developing the heat for vaporizing or expanding the fluid in the container.

Various conditions exist in the practical adaptation of heat or vapor motors to control devices. The requirements of power and travel of the motor will vary according to application and kind of work. Controlling the travel of the motor has heretofore been obtained mainly by the insertion of a limit switch in circuit with a heating element, the limit switch acting as a cut-out when the motor reaches a predetermined travel or expansion. I have found that the use of a limit switch is generally unsatisfactory due to the possible failure of the switch and the constant fluctuation which the motor undergoes during the repeated making and breaking of the circuit by the switch.

On the other hand heat or vapor motors have heretofore been built around the device to be controlled and not as a standard unit capable of universal adaptation. They have never been designed, in so far as I am aware, to have a given quantity of fluid, which, when volatilized or expanded, will expand the motor a predetermined distance. The travel of the motor and the power required for any given adaptation are important factors in the design.

To secure mechanical strength of the motor itself, however, the size of the motor must necessarily provide an interior capacity which is greater than the exact amount of fluid required for proper expansion. Consequently, it has been necessary, heretofore, either to use volatile fluid greatly in excess of that needed to give the desired expansion, with a limit switch inserted in the circuit to control the expansion, or else a small amount of fluid in a partly filled motor with air space above the fluid and the fluid out of direct influence of the heat. If the motor is not completely filled with fluid, the air will first be compressed, which delays initial action of the motor and renders the application of the motor to controls having accurately timed operations exceedingly difficult.

The most practical arrangement which I have so far found from my experiments is to provide a heating zone with which the fluid is in intimate contact, so that the fluid will be immediately influenced by the heat. Such an arrangement has been disclosed in co-pending application Serial No. 366,933, filed May 29, 1929, which is a division in part of co-pending application Serial No. 37,091, filed June 15, 1925, now Patents No. 1,885,285 issued Nov. 1, 1932, and No. 1,874,710, issued Aug. 30, 1932, respectively.

In this co-pending application, the heating zone is adapted initially to receive the fluid, but upon a rise of temperature, causes the fluid to expand or volatilize and drive the remaining fluid which does not expand or volatilize out of the heating zone. Once the level of the fluid is driven out of the heating zone, further expansion or volatilization is checked and the motor is held in a predetermined expanded position. By driving the level of the fluid out of the heating zone, the need of a limit switch to control the expansion of the motor is eliminated. I have found, however, that the same results can be accomplished without driving the level of the fluid out of the heating zone or completely filling the motor with a volatile fluid.

Accordingly, the present invention is directed to an improved form of heat or vapor motor adapted to contain a limited amount of volatile fluid, preferably sufficient to secure the desired predetermined expansion of the motor, and preferably disposed within the heating zone in a manner to act upon a pressure transmitting medium filling the remaing portion of the motor whereby, upon expansion or volatilization of the volatile fluid, the pressure exerted upon this transmitting medium causes the motor to expand and to be held expanded at a predetermined distance. This arrangement also eliminates the need of a limit switch for controlling the expansion of the motor. The volatile fluid in its expanded or volatilized condition may remain under the influence of a continuously developed heat in the heating zone without causing the motor to move beyond its predetermined expanded position. Not only does this arrangement eliminate the need of a limit switch for cutting off the heat to control the expansion of the motor, but very advantageously allows the use of a limited amount of fluid to secure the desired expansion which may be easily and accurately determined.

Figure 2:
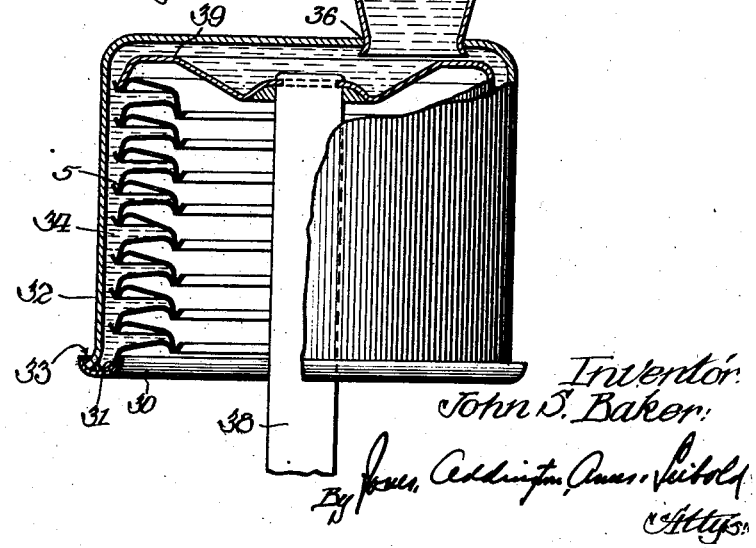

Further objects and advantages of the invention will be apparent from the following detailed description when taken in connection with the accompanying drawing, in which:

Figure 1 is a vertical sectional view of a heat motor embodying the invention; and Fig. 2 is a view, partly in section and partly in elevation, of a heat motor wherein the expansible and contractible vessel is contracted upon expansion of the volatile fluid.

In the drawing, wherein, for the purposes of illustration, there are shown several preferred embodiments of my invention, the vapor or heat motor may comprise an expansible and contractible vessel 5, a closed heating chamber 6 provided by a tube 17, or boiler, in communication with the vessel and which receives a portion of a pressure transmitting medium 7 disposed within vessel 5.

This vessel 5 is preferably shown as comprising a well-known form of bellows, which readily expands or contracts upon an increase of pressure therein. Tube 17 may be closed at either end and communicate at the opposite end with vessel 5.

A limited amount of volatile fluid 8, which is preferably a predetermined quantity, is confined within the upper end of tube 17. Pressure transmitting medium 7 may be a fluid or a semi-solid, and preferably has a much higher boiling point than the volatile fluid 8. I prefer that medium 7 merely acts as a pressure transmitting medium to transmit the pressure of the volatile fluid 8 upon expansion or volatilization whereby to expand vessel 5 a predetermined distance. The advantages of the present arrangement will be quite obvious to those skilled in the art. With the need of providing only a small quantity of volatile fluid 8 to secure the required predetermined expansion of the heat motor, it will be a matter of easy calculation to ascertain the exact amount of volatile fluid 8 required for a given expansion of vessel 5.

As to the specific form of heating device that may be used, it is obvious that the source may be an electrical resistance coil or heating flame conveniently located at or adjacent to tube 17. A heating zone will be provided within tube 17 for heating volatile fluid 8 and expanding it in a downward direction. The pressure created by such expansion of volatile fluid 8 at the upper end of tube 17 will gradually increase until there will be no further expansion or volatilization of the fluid. The pressure thereupon remains substantially fixed. The pressure depresses the level of pressure transmitting medium 7 downwardly into tube 17, thereby driving a greater amount of this medium standing in tube 17 into vessel 5. The quantity of pressure transmitting medium 7 depressed into vessel 5 will determine the extent of the expansion of the latter.

As shown by the various forms of my invention, it may be, by means of completely expanding or volatilizing the volatile fluid and maintaining thereafter the pressure in the tube substantially constant, that the predetermined expansion or movement of vessel 5 may be effectively obtained and held without danger of an excessive pressure which will burst the vessel.

Referring now to Figure 1, the expansible and contractible vessel 5 is secured to a base or nonmovable end wall 10. Base 10 may be secured in position in any suitable way. An aperture 11 may be provided in base 10 to receive the lower end of tube 17 in hermetically sealed relation. The opposite end of bellows 5 may be movable and carry a suitable actuating member 12.

A heating element 20, which in this particular case is in the form of an electrical resistance coil, suitably surrounds tube 17. This coil is, of course, electrically insulated from tube 17 but is in close proximity thereto to conduct the heat developed by the current flow through the coil. I have shown the circuit to include a thermostat 13 and a source of current 14. However, it will be obvious that the arrangement has been shown for the purposes of illustration only and that other arrangements for heating may be provided to accomplish certain advantages of the invention.

It may be desirable in the construction of a heat or vapor motor to allow bellows 5 to contract instead of expand upon the power stroke.

Such an arrangement may be obtained by providing a base 30, to which the lower open end of bellows 5 is hermetically sealed, as indicated at 31 in Fig. 2. A housing or casing 32, which is slightly larger in diameter, is placed over bellows 5 so that its lower open end may be hermetically sealed to plate 30 at 33, thereby providing a closed chamber 34 into which the pressure transmitting medium is depressed to exert a pressure upon and contract the bellows 5. Tube 17 is also closed at the upper end and communicates with chamber 34 in any suitable way, say by hermetically sealing the lower end of the tube to casing 32, as indicated at 36. An actuating arm 38 may project inwardly and upwardly into bellows 5 so as to attach to an upper wall 39 whereby contraction of the bellows will move this arm downwardly.

By providing a limited amount of volatile fluid for expansion or volatilization within the heating zone of the vapor motor, the expansion of vessel 5 to any desired distance may be easily ascertained in the construction of the device. Pressure transmitting medium 7 acts primarily as a non-rigid filling medium occupying that portion not occupied by the volatile fluid, so that, when the latter expands or volatilizes, the pressure is immediately transmitted to be effective in expanding the bellows.

As disclosed in the aforesaid copending application, it is highly desirable to omit air pockets or empty space within a heat motor employing a volatile fluid. In order to secure prompt initial action of the heat motor when thermostat 13 or the like closes the heating circuit, the expanding portion, say the vessel 5, of the heat motor, should be immediately influenced by the pressure initially developed. If air pockets or empty spaces are permitted, this initial pressure is first utilized in compressing this air, thereby slowing down the initial expansion of the bellows and causing a sluggish action.

It will be understood that any combination of materials, fluids, or the like, may be employed within the heat motor disclosed herein to accomplish the advantages set forth. It is considered to be within the knowledge of one skilled in the art to provide any such change in the materials or fluids, and consequently I do not intend to be limited to the details disclosed herein.

I claim:

1. A heat motor having a closed vessel provided with an expansible part and a non-expansible part, a non-volatile fluid for said expansible part, a volatile fluid for said non-expansible part, and a heating device for said non-expansible part, said heating device volatilizing said volatile fluid to cause said non-volatile fluid to transmit the pressure to said expansible part and to expand the same, the substantially complete volatilization of said volatile fluid predetermining the expansion of said expansible part irrespective of the continued heating action of said heating device.

2. A heat motor having a closed vessel provided with an expansible part and a non-expansible part, said non-expansible part including a tube and a heating element therefor, a non-volatile fluid in said expansible part extending partially into said tube, and a volatile fluid above said non-volatile fluid in said tube adapted to be volatilized by the heat effects of said heating element whereby the pressure thereof depresses said non-volatile fluid to expand said expansible part, the substantially complete volatilization of said volatile fluid predetermining the expansion of said expansible part under the heating effects of said heating element.

J. S. BAKER.